March 29, 1960  F. KLUMPP, JR  2,930,840
STRAIN RELIEF BUSHING
Filed March 22, 1955

INVENTOR.
FERDINAND KLUMPP, JR.
BY
William A. Zaleuk
ATTORNEY

United States Patent Office 2,930,840
Patented Mar. 29, 1960

2,930,840

STRAIN RELIEF BUSHING

Ferdinand Klumpp, Jr., Union, N.J.

Application March 22, 1955, Serial No. 495,950

3 Claims. (Cl. 174—153)

This invention relates to a self-locking strain-relief bushing which is adapted to securely lock an electrical conductor or cable in the bushing or grommet and to a plate or support in which the bushing or grommet is inserted.

Strain relief devices are employed in connection with various electrical appliances and apparatus, such as radio, television, and many other forms of electrical devices and apparatus, and serve to relieve strain upon the electrical conductor wires and cables so as to avoid possible severance from or impair proper connection of the conductor wires to terminals to which they are normally connected, and to also preclude damage to parts and avoidance of possible short circuits.

One of the most widely and currently used types of strain-relief devices is composed of two separate cooperating elements, each formed of suitable insulating or dielectric material.

In assembling the two parts, the two parts must be separately grasped and lifted from separate bins or containers requiring the use of two hands. In positioning the conductor or cable in one half of the bushing or grommet the other half must be set aside and then picked up while holding the cable and the one half bushing or grommet and then both halves must be registered prior to locking the two parts or halves over the cable.

Further, the above type of bushing or grommet requires balanced inventory necessitating constant checking and separate storage.

While efforts have been made to provide attached halves, the resulting structure does not provide a bushing or grommet which can be easily handled or closed on the conductor being clamped. Nor have the prior art structures offered the most efficient use of raw material or promoted ease of manufacture or ease of assembly and use.

It is an object of my invention to provide an improved self-locking strain-relief bushing which eliminates the disadvantages pointed out above.

Another object of my invention is to provide such a bushing or grommet which has all the desirable features of a two-part bushing or grommet but one in which the two halves or parts are integrally joined together and yet may be applied to a conductor or cable with ease preparatory to being mounted in an opening in a supporting member.

A still further object of my invention is to provide such an improved bushing or grommet which utilizes material usually wasted.

In accordance with my inveniton I provide a strain insulator having two parts integrally joined and having cooperating structures for locking the parts against longitudinal movement when assembled. Connected between registering ends of the two parts I provide a loop formed integrally with the two parts of the strain insulator. The loop is arcuate shaped so that when a conductor is received between the two parts, the connecting loop will be offset with respect to the conductor. The loop has length and is flexible to permit easy handling of the two parts for facilitating assembly. The shape of the loop and its position relative to the two parts makes it possible to utilize part of the runner formed during molding.

The detailed description of my invention follows, reference being had to the drawing, in which.

Figure 1:
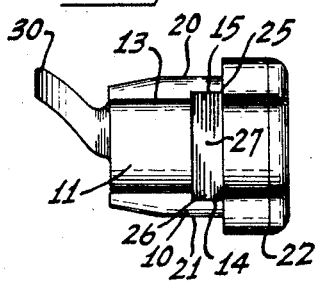
Fig. 1 is a top plan view of an assembled strain bushing or grommet made according to my invention.
Figure 2:
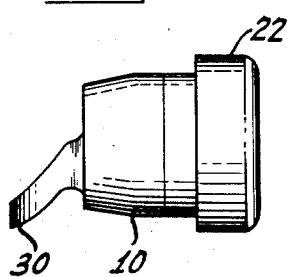
Fig. 2 is a bottom view of Fig. 1.
Figure 3:
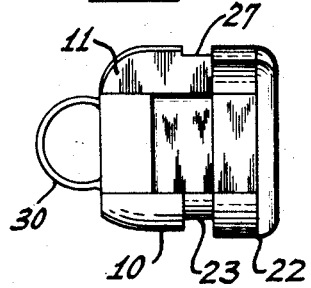
Fig. 3 is a side elevation of the device shown in Figs. 1 and 2.
Figure 4:
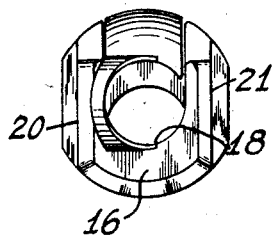
Fig. 4 is a left end view of Fig. 1.
Figure 5:
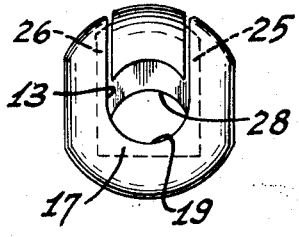
Fig. 5 is a right end view of Fig. 1.

A strain insulator made according to my invention comprises a body portion 10 and an insert or grip block 11 cooperating therewith the body portion and grip block providing interconnected shank sections which may be said to constitute an axial shank. The body portion is provided with a first shank section having flat sides 20 and 21 to be received within an appropriate supporting member providing a properly shaped opening or aperture therein and has an end flange or head 22 which abuts against the surface of a supporting member when in use and has a depression or groove 23 adjacent the flange member into which the wall of the supporting member projects. The body portion may also be made elongated or round in transverse section. The body member 10 is provided internally therein with a chamber 12 which communicates with the exterior of the body member through a channel 13 into which the grip block 11 having a second shank section provided with a flange or head at one end is inserted in use. The side walls of the channeled portion 13 of the body member 10 are provided with guide channels or grooves 14 and 15 which extend transversely of the longitudinal axis of the bushing or grommet. The chamber 12 is provided with end walls 16 and 17.

Received within the channel member is the insert or grip block 11 having elongated extensions or ribs 25 and 26 which are reecived within the channels 14 and 15. The member 11 is provided with a downwardly extending projection or tongue 28 which is provided with an arcuate recess for purposes to be described. This insert is provided with a transverse groove or channel 27 oppositely disposed to groove 23 for receiving therein the wall of a supporting member. The insert is otherwise shaped to conform to the shape of the body member 10.

Figure 8:
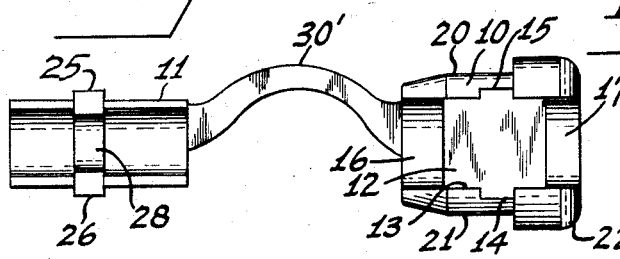
Fig. 8 is a cross-section of a strain bushing or grommet shown in the other figures positioned within the supporting member and clamped to a conductor.

In accordance with my invention I provide an elongated flexible strap or connection or hinge 30 formed integrally with the two parts of the bushing or grommet. While the strap is shown connected to one end of the bushing or grommet, it could as well be connected to the other ends of the two part bushing or grommet. However, for appearance sake, since the flange 22 is normally exposed, it is preferable to have the strap at the end opposite the flange. The strap is of arcuate form so that it is off-set as at 30' with respect to the conductor clamped between the two parts of the bushing or grommet. The bushing or grommet assembled within the supporting member 30 and engaging a conductor 31 is shown in cross-section in Fig. 8.

The connecting strap or loop or hinge 30 is of sufficient length so that the parts may be moved relative to each other with ease in all planes, there being no great resistance to inserting member 11 with member 10 for gripping the cable. While it permits ease of handling, requiring the use of only one hand for holding the parts and cable during assembly, it does not interfere with the assembly since it is off-set with respect to the cable being clamped. A further advantage of the shape of the loop is that it can be formed from the side runners which are utilized during molding of the bushing. This has the advantage of making it unnecessary to strip the runners from the bushing or grommet and also conserve material which is normally cut from the finished product. A bushing or grommet made according to my invention eliminates all the disadvantages pointed out above and provides a structure which facilitates the assembly of the bushing or grommet with its clamped conductor and supporting structure, thus increasing efficiency during all operations relative to handling and assembling the bushing or grommet in use.

Figure 9:
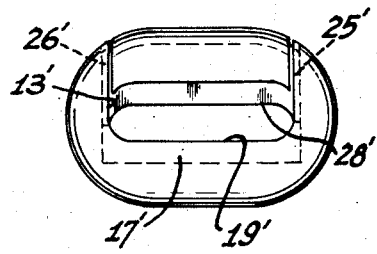
Fig. 9 is a front end view of a modification of the strain insulator shown in Figs. 1 to 3, inclusive.
Figure 6:
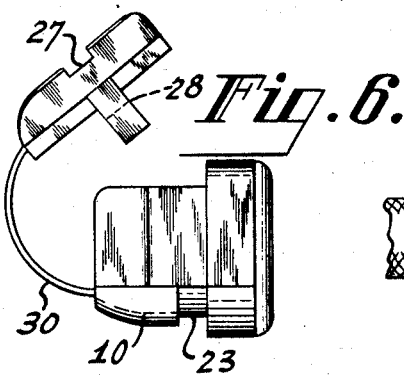
Fig. 6 shows the relationship of the two parts preparatory to assembly.
Figure 7:
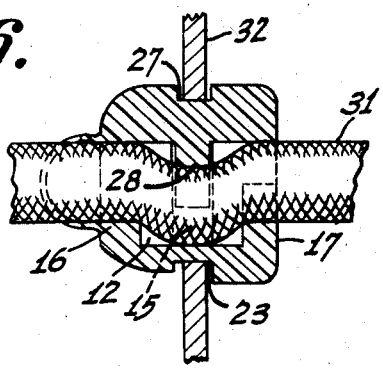
Fig. 7 is a plan view of the two-part bushing or grommet in its unassembled relationship as taken from the mold.

As shown in Fig. 9 the strain insulator or grommet may be provided with an elongated transverse section to take a flat cable assembly. The prime numerals indicate parts corresponding to the elements or parts of the insulator shown in the other figures.

I claim:

1. A one-piece strain relief grommet of molded plastic dielectric material adapted to be inserted axially and snapped into fixed position within the complementary aperture of a panel, said grommet including an axial shank comprising a pair of cooperating shank sections tapering toward and integrally joined at their entering extremities by a resilient hinge, the bending axis of which traverses the shank axis, said hinge serving to permit juxtapositioning of said shank sections for insertion within an aperture, one of said shank sections having substantially greater circumferential extent than the other shank section and providing a longitudinal recess within which the other shank section interfits in clamped position, a head portion associated with each shank section at the extremities oppositely disposed from the entering end thereof having an outwardly radiating surface for engaging one side of an apertured panel, shoulder means associated with at least one of said shank sections and spaced axially from the panel-engaging side of said head portions for engaging the opposite side of the panel, the juxtapositioned portions of the shank sections and said head portions having a longitudinal passage for accommodating an elongated conductor, and means extending from a wall defining said passage for impinging a conductor to secure it in clamped position within the grommet, said hinge being of sufficient length and of such thickness as to permit ready relative movement between the shank sections in all planes prior to assembly to facilitate insertion of said conductor, said hinge having an arcuately shaped form to provide an offset loop having no part registering with the opening projected from the hinge end of said bushing.

2. A strain relief bushing of insulating material for holding an electrical conductor in a suitable aperture in a mounting member, comprising a body portion having an end wall and a flange at one end to engage the mounting member on one side thereof and having a locking groove adjacent said flange, said bushing having a chamber and a longitudinal channel communicating with said chamber and extending through an elongated opening in the end wall of said body portion, grooves on the side walls of said longitudinal channel in said body portion extending transversely of the longitudinal axis of said bushing, a grip block having substantially the same length as said body portion and fitting into said channel, said grip block having ribs on opposite sides thereof for cooperating with the grooves on the side walls of said longitudinal channel to prevent relative longitudinal movement of said grip block and body portion, a tongue on said grip block to extend into said chamber to grip a cable positioned within said channel between said tongue and the surface of said chamber, and an integral flexible connecting strap connected between registering ends of the body portion at one end of said body portion and the grip block for flexibly holding said body portion and grip block together to permit ready relative movement therebetween in all planes prior to assembly and of sufficient length to permit the ribs on the grip block to be inserted in the grooves on the side wall of said longitudinal channel when the tongue on said grip block is inserted into said chamber, said connecting strap being connected adjacent the outside surfaces of said body portion and said grip block and being arcuate in shape whereby an offset loop is provided when said bushing is assembled, said strap having no part registering with the opening projected from the strap end of the body portion of said bushing.

3. A strain-relief bushing of insulating material for holding an electrical conductor in a suitable aperture in a mounting member, comprising a body portion having a flange at one end to engage the mounting member on one side thereof, said body portion having a chamber therein and a locking groove adjacent said flange on the outside thereof, said body portion having a longitudinal channel therethrough communicating with said chamber, grooves on the side walls of said longitudinal channel in said body portion extending transversely of the longitudinal axis of said bushing, a T-shaped grip block having the longitudinal part of the T of substantially the same length as said body portion and fitting in said channel, said longitudinal part of said grip block having a locking groove to receive a portion of the mounting member therein, the stem part of the T being adapted to extend into said chamber having ribs on opposite sides thereof for cooperating with the grooves on the side walls of said longitudinal channel to prevent relative longitudinal movement of said T-shaped grip block and body portion and having an end formation to grip a cable positioned within said chamber between said end formation and the surface of said chamber, the dimensions of the T being such as to cause the stem part of the T to force the cable toward the bottom of said chamber when the bushing is inserted into said suitable aperture in the mounting member, and an integral flexible connecting strap connected between registering ends of the body portion and the grip block at one end of said body portion and said grip block for flexibly holding said body portion and grip block together and of such length as to permit ready relative movement therebetween in all planes prior to assembly of said body portion and said grip block so that the ribs on the T-shaped grip block can be inserted in the grooves on the side wall of said longitudinal channel when the stem part of the T-shaped grip block is inserted into said chamber, said connecting strap being connected adjacent the outside surfaces of said body portion and said grip block and being formed to provide an offset loop when said bushing is assembled, said offset loop having no part registering with the opening projected from the strap ends of the body portion of said bushing.

References Cited in the file of this patent

UNITED STATES PATENTS

| | | |
|---|---|---|
| 2,424,759 | Klumpp | July 29, 1947 |
| 2,563,604 | Hultgren | Aug. 7, 1951 |
| 2,895,003 | Rapata | July 14, 1959 |